United States Patent [19]

Kawamura et al.

[11] 4,022,440
[45] May 10, 1977

[54] METHOD FOR PRODUCING PLASTIC COMPOUND AND AN APPARATUS THEREFOR

[75] Inventors: Yuzo Kawamura, Otsu; Mamoru Takiura, Kawasaki; Yoshihiro Hayashizaki, Sagamihara, all of Japan

[73] Assignees: Ikegai Iron Works, Ltd., Tokyo; Yugen-Kaisha Idea Research, both of Japan

[22] Filed: Feb. 19, 1975

[21] Appl. No.: 551,064

[30] Foreign Application Priority Data

Feb. 21, 1974 Japan .............................. 49-20746
Feb. 26, 1974 Japan .............................. 49-21937

[52] U.S. Cl. .................................... 259/192; 259/5; 259/102
[51] Int. Cl.² ........................ B29B 1/08; B29B 1/10
[58] Field of Search .......... 259/102, 191, 192, 193, 259/185, 189, 5, 6, 7, 8, 9, 10, 21, 22, 25, 26, 40, 41, 42, 45, 46, 103, 104, 109, 110; 425/201, 207, 208, 209

[56] References Cited

UNITED STATES PATENTS

| 2,968,836 | 1/1961 | Colombo | 259/192 |
| 3,155,056 | 11/1964 | Smith | 259/192 |
| 3,375,549 | 4/1968 | Geyer | 259/192 |
| 3,746,315 | 7/1973 | Rizzi | 259/21 |
| 3,749,374 | 7/1973 | Buchheit | 259/104 |
| 3,841,814 | 10/1974 | Hans | 259/192 |

*Primary Examiner*—Robert W. Jenkins
*Attorney, Agent, or Firm*—Shlesinger, Arkwright, Garvey & Dinsmore

[57] ABSTRACT

A method for producing plastic compound comprises pressure-feeding a resin and an additive therefor into a barrel, and applying compressive force and shearing force on the resin and the additive in the barrel at a predetermined temperature in such a manner that the position of the minimum clearance defined between a bore of the barrel and the maximally diametered portion of a rotor continuously changes with respect to the whole circumferences of the barrel and the rotor, whereby the resin and the additive are uniformly kneaded.

22 Claims, 22 Drawing Figures

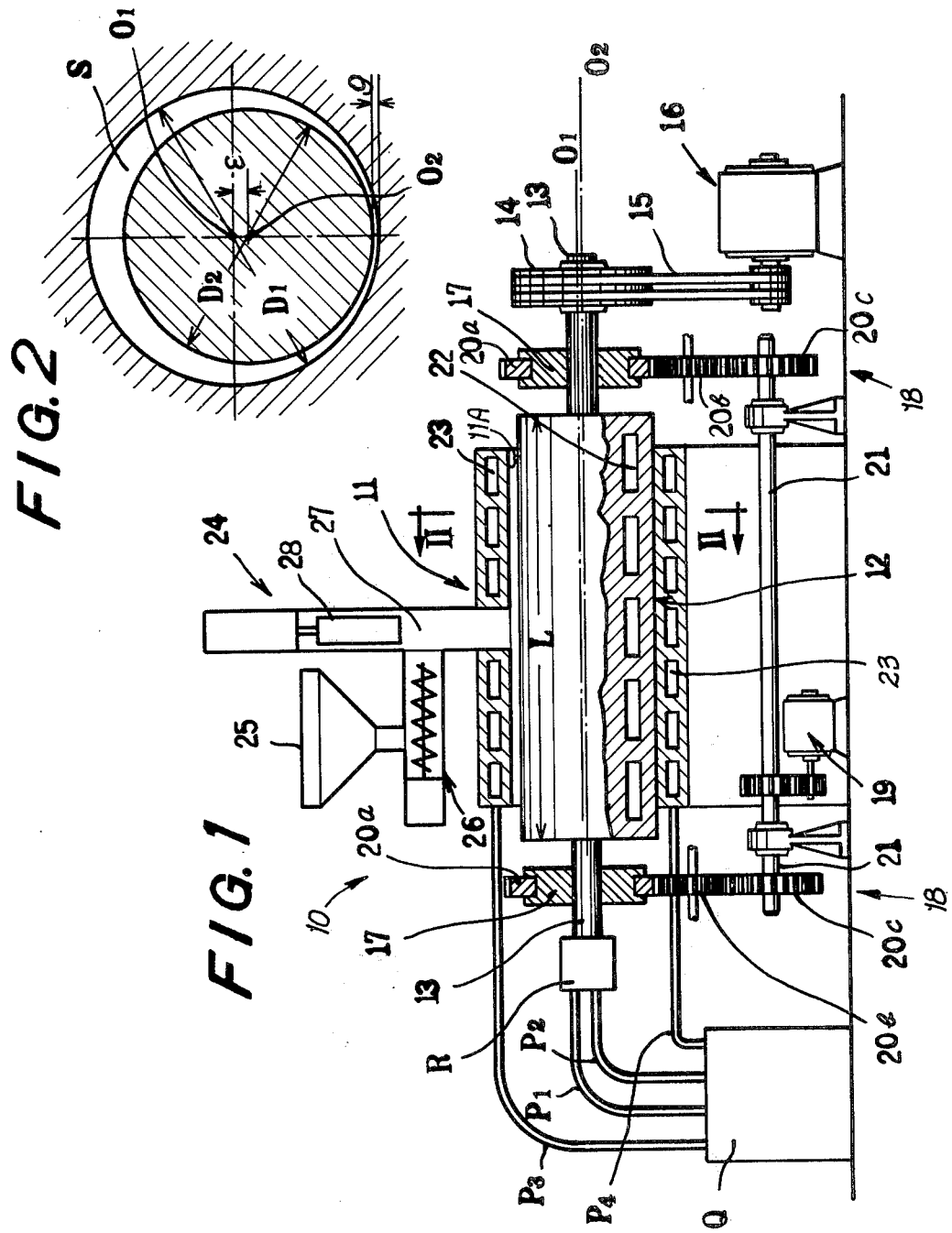

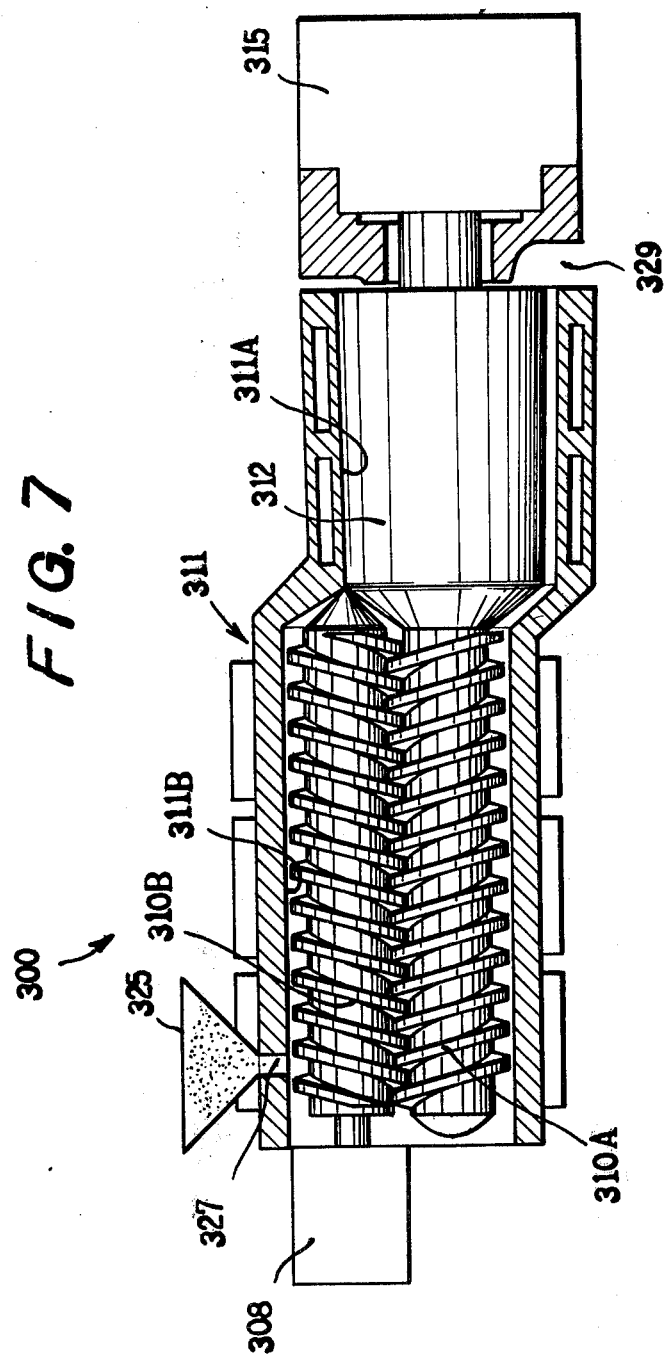

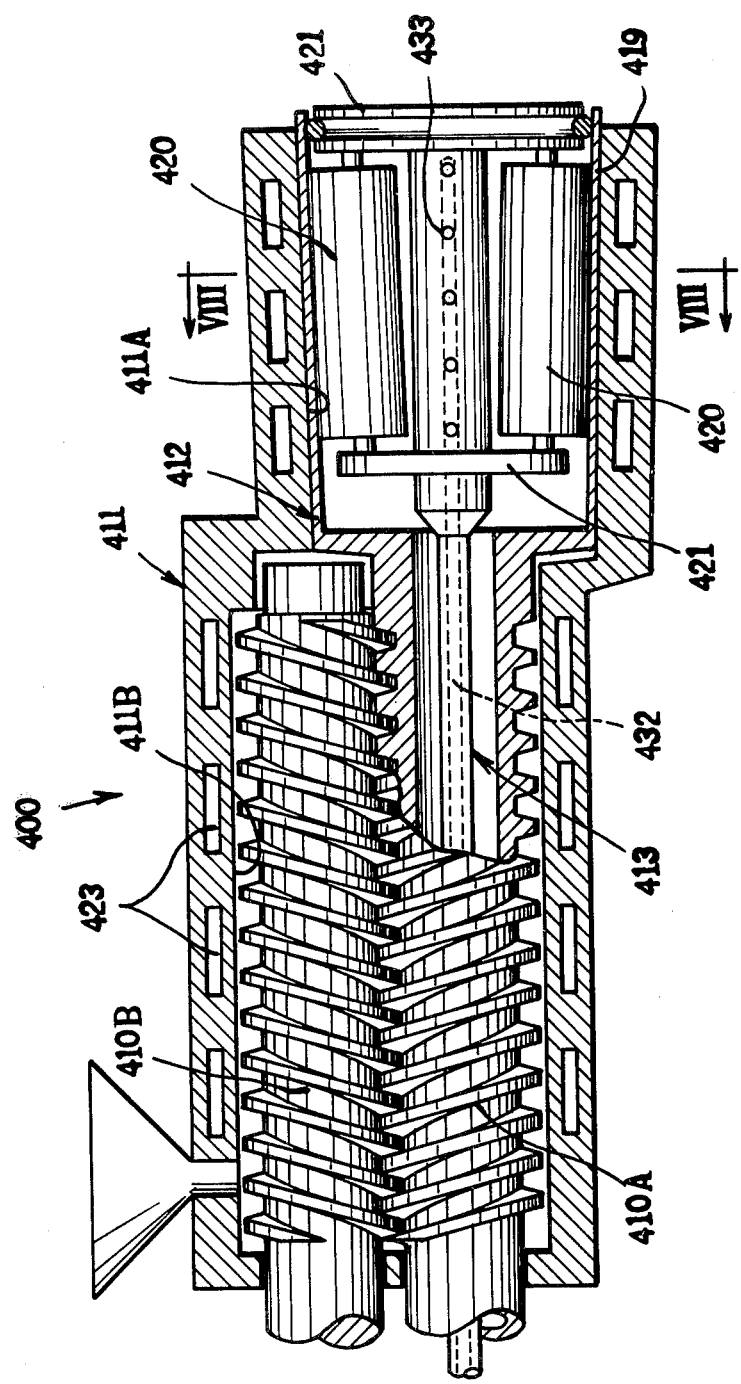

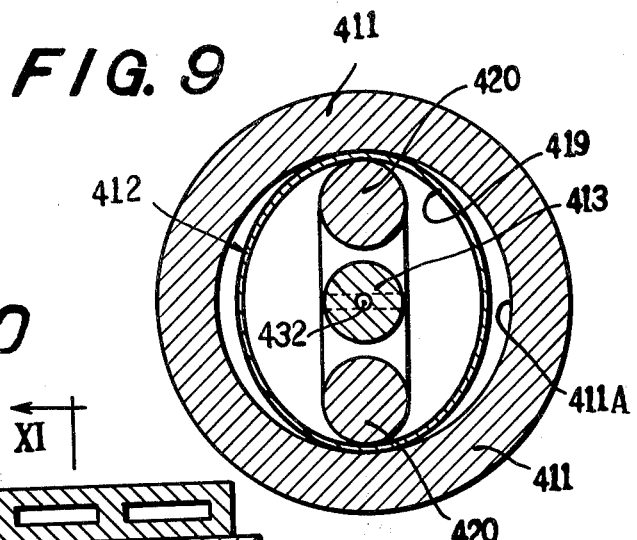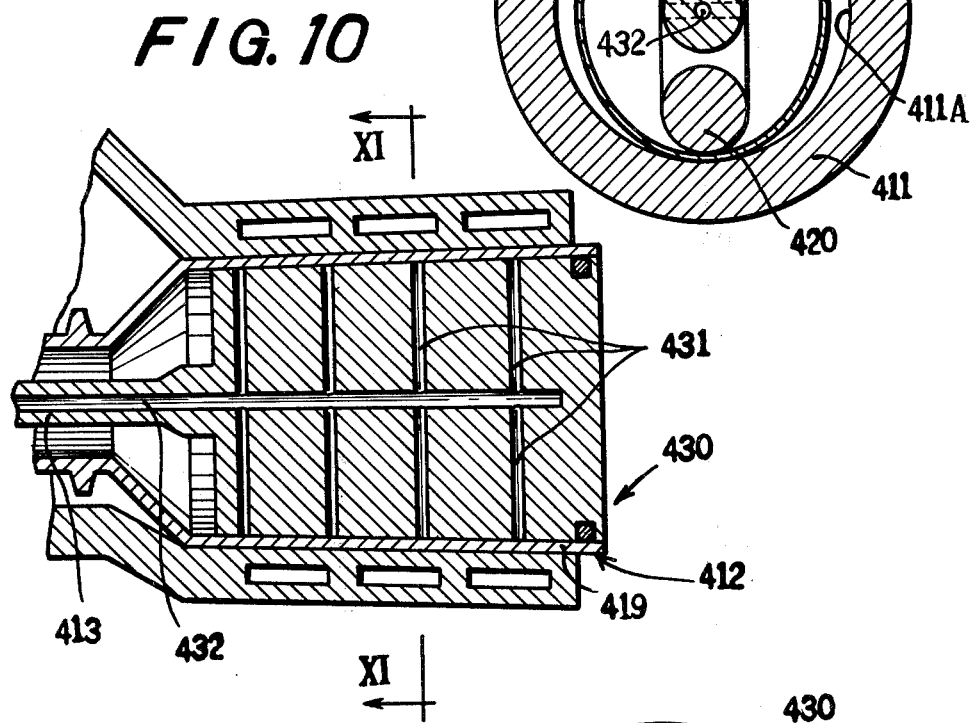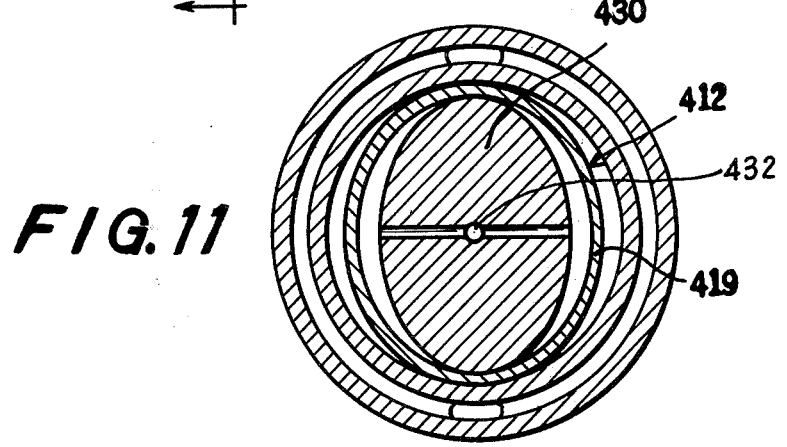

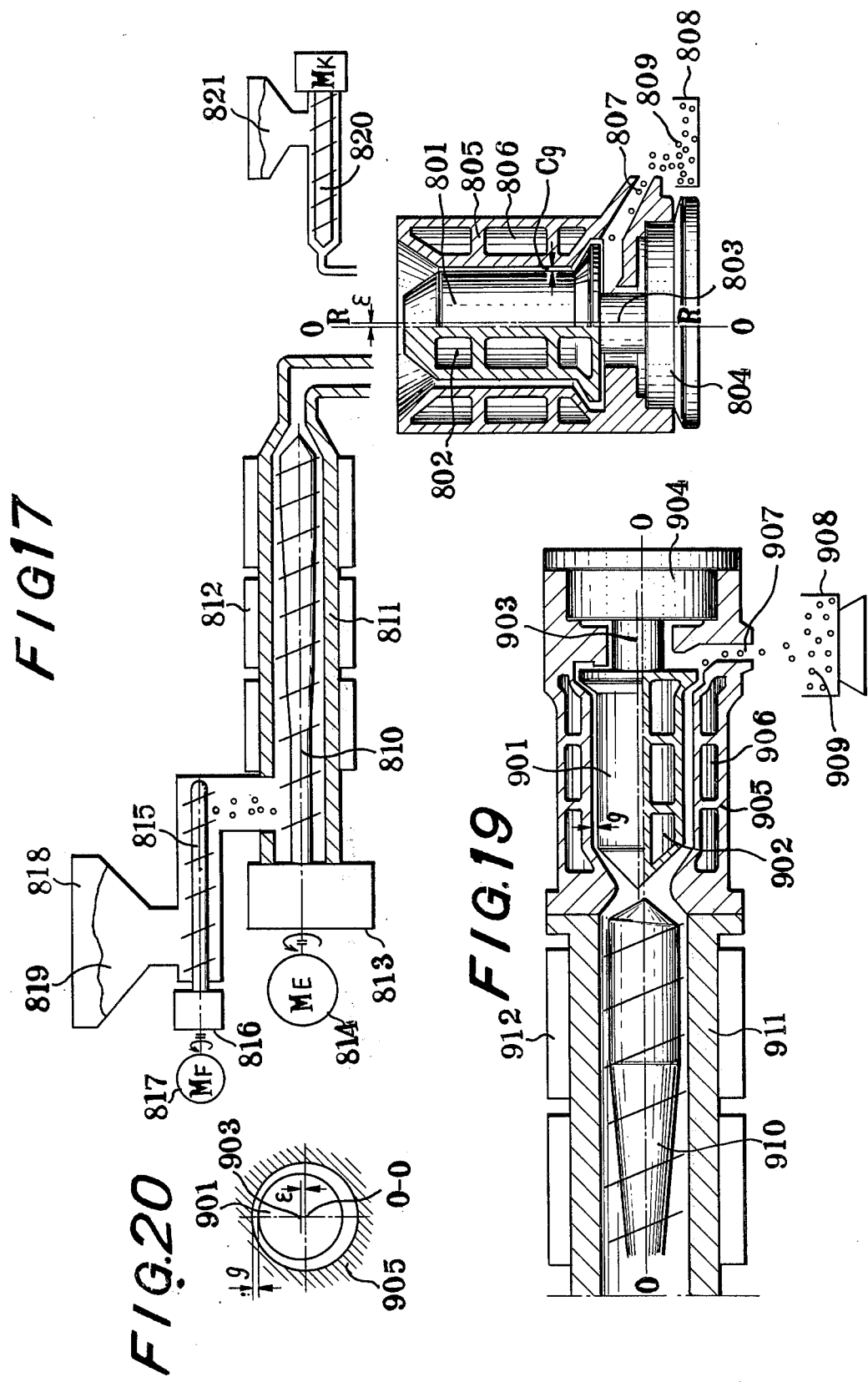

METHOD FOR PRODUCING PLASTIC COMPOUND AND AN APPARATUS THEREFOR

BACKGROUND OF THE INVENTION

1. Field of the Invention

The present invention relates to a method for molding plastic compound and an apparatus therefor and more especially it relates to a method for producing plastic compound with excellent dispersion property from a synthetic resin and an additive therefor, and an apparatus for said method.

2. Description of the Prior Art

For example, one existing method for plastic coating comprises a step of coating the surface of a solid substance, for example, metal with liquid resin, and the other existing method comprises a step of coating by heat-fusion bonding powdered resin on the surface. Recently, the latter method has been increasingly used because it affords achievement of uniform coating and application to coating with various kinds of plastic such as high polymer plastic, fusion-resisting plastic and the like which are difficult to be used as coating materials. By the latter method or a powder coating method, a uniform coated film can be obtained on the whole surface, but such a coated film is very thin so that color shading or crazing are apt to occur when pigments or other additives are not uniformly dispersed in a dispersant or a resin. Such dispersion of an additive in a powdered resin is achieved by kneading of the resin and the additive, which kneading comprises repeated application of compressive force and shearing force on material to be treated. However, effective kneading of material cannot be achieved by the prior art by which especially sufficient effective shearing force is not applied to the material.

Powdered coating materials have been manufactured by a conventional single- or multiple-screw extruder with torpedo for extrusion molding or an improvement thereon, but such an apparatus has not been desirably effective. Kneading, which determines dispersion property of the obtained compound, is regarded as an important problem not only in powder coating but in usual molding. Thus, it is not too much to say that kneading will determine the quality of a molded plastic product.

When synthetic resin and additive such as pigment and hardener are preliminarily heated and then kneaded and dispersed at a stroke by means of one or two screws, the kneading and dispersing operations are not effectively carried out so that the synthetic resin material is apt to be solidified around the screw or when the extruded material is powdered in order to carry out painting, air holes of 50 to 60$\mu$ are apt to remain in the coating. It is quite unclear that the air holes are generated due to either coagulation of the pigment or that of the hardener.

Before the screw extruder is used, the kneading and dispersing operations have been carried out by means of the roll. When the roll is used, the material can be well kneaded and accordingly air holes respectively are made much smaller than those in case of the screw extruder. However, the roll kneading and dispersion apparatus employs a batch system, so that the quality of the products becomes uneven.

Accordingly as required amount of powdered coating material to be made in a roll apparatus increases, the batch system is apparently disadvantageous, thus a continuous screw extruder has been employed instead of the roll apparatus.

The present invention is proposed in order to obtain resin material of plastic resin and additive therefor having good kneading and dispersing property by combining the screw extruder and the roll means.

According to the present invention, the screw extruder for preliminarily and effectively heating, stirring and mixing the plastic resin and the additive therefor is provided. The stirring and mixing operations are carried out preliminarily at a temperature where a solidifying reaction does not occur in order to more effectively perform the kneading and dispersing operations at the next step for the material by high-speed shearing. Therefore, the length of the screw can be made smaller than that of an ordinary screw and the ratio of L/D is less than 16.

Two screw extruder produces a best means to obtain a low and even temperature distribution in the extruder system.

Furthermore, the ordinary screw having the purpose of stirring and mixing is effectively employed. Further, internal pressure applied to the material is low, so that almost of the resin material is prevented from staying in the screw extruder.

According to the present invention, next, semi-molten resin material made by the screw extruder is supplied to a high speed shearing, kneading and dispersing apparatus.

This apparatus of the present mention, called an internal roll system, employ a barrel and a rotor. The rotor rotates inside of the barrel and revolving and shearing force is applied upon the resin material disposed in a narrow clearance between the barrel and the rotor during its rotation and revolution.

The rotor is revolved towards the direction which is opposite to that of its rotation. The position of a minimum clearance is changed or moved around the inner circumference of the barrel.

The resin material is adapted to be equally subjected to shearing force while the resin material progresses from an inlet of the apparatus to an outlet thereof.

According to the tests carried out by the inventor, a minimum clearance between the barrel and the rotor is preferably 0.05 to 0.5 mm. The relative speed on the inner circumference of the barrel between them is desirably 0.5 m/sec to 10 m/sec. The faster the revolving speed of the rotor is and accordingly the faster the rotating speed is so as to maintain said desirable relative speed, the quality of the obtained resin is excellently improved.

Especially, particles of the pigment are smaller than several micron and secondary coagulated in its natural condition. Therefore, it is necessary to disperse the coagulated particles by applying shearing force upon them in the narrow clearance between the barrel and the rotating rotor.

In case that the screw extruder and a high speed shearing, kneading and dispersing apparatus which are respectively independent are combined, the products extruded from the screw extruder and a hardener supplied from another independent apparatus can be supplied together to a high speed shearing grading apparatus.

Thus, the screw extruder can be supplied with the plastic resin material and additive having no hardener. So that the plastic material can be heated, stirred and mixed without solidifying and furthermore the plastic material can be freely extruded because there is not provided a high speed shearing, kneading and dispersing apparatus.

The conventional method for kneading plastic molding compound comprises passing the material through the minimum clearance defined between the outer surface of a screw, a modification thereof or the like disposed in a barrel and the inner surface of the barrel, or defined between a pair of compressing rollers, at said minimum clearance compressive force and shearing force being applied on the material or a resin and an additive. However, said minimum clearance is located in a fixed position with respect to the whole circumference of the inner surface of the barrel or to a predetermined length within the barrel. Therefore, the material passes through said minimum clearance only at low frequency, and at the same time said passing is not smoothly carried out. However, if rotational speed of a rotor is increased in order to promote passing of the material, the temperature of the passing material rises rapidly, thus causing thermal metamorphism of the compound, making shearing ineffective, and resulting, especially in case of thermoplastic compound, in insufficient plastization so that unfused material is mixed into a molded product or the additive is insufficiently dispersed. In addition, if the clearance is made larger, compressive force and shearing force are not sufficiently applied on the material, thus never achieving preferable kneading.

In short, in the conventional method, compressive force and especially shearing force are not effectively applied on the material passing through the minimum clearance portion, so that sufficient kneading cannot be achieved.

From such a viewpoint, development of an apparatus for effectively kneading a synthetic resin and an additive is earnestly desired.

SUMMARY OF THE INVENTION

The method of the present invention is characterized by pressure-feeding a synthetic resin and an additive therefor into a barrel, applying compressive force and shearing force on the synthetic resin and the additive at a predetermined temperature in such a manner that the position of the minimum clearance defined between a bore of the barrel and the maximally diametered portion of a rotor can continuously change with respect to an advance around the whole circumferences of the barrel and the rotor, and thereby uniformly kneading the resin and the additive.

The present invention further provides an apparatus for carrying out said method.

An apparatus according to the present invention comprises a means for pressure-feeding a synthetic resin and an additive therefor into a barrel, a rotor which operates so that the position of the minimum clearance defined between a bore of the barrel and the outer surface of the maximally diametered portion of said rotor can continuously change with respect to the whole circumferences of the barrel and the rotor, a temperature controller for maintaining the resin and the additive passing through the clearance between the barrel and the rotor at a predetermined temperature. Said pressure-feeding means may be a pressure feeder of piston-cylinder type or a feeder of screw type provided outside the barrel, said feeder being adapted to press material fed from a hopper through an inlet into the barrel. Further, said pressure feeder may be a screw provided adjacent to a rotor within the barrel, said screw being adapted to press material, which has been fed from a hopper through an inlet into the barrel, forward into the operation of the rotor. The screw may be formed separate from the rotor or integral therewith. In the former case, however, the space between the rotor and the screw should be as small as possible.

When a pressure feeder is provided outside a barrel, the length of the barrel may be substantially equal with that of a rotor. And when a pressure feeder is provided inside a barrel, the barrel should be of such a length as affording to contain a screw and a rotor thereinside.

In a preferred embodiment of the apparatus according to the present invention, said apparatus includes a rotor disposed within a barrel with a suitable eccentricity with respect to the bore of the barrel and formed in a rigid cylindrical body, said rotor being adapted to move around the central axis of the bore of the barrel at a predetermined speed while rotating on its own axis at a predetermined speed, so that the position of the minimum clearance defined between the inner surface of the barrel and the cylindrical surface of the rotor can continuously change or advance around the barrel circumference.

In another embodiment of the present invention, an apparatus includes a rotor disposed within a barrel concentrically with a bore of the barrel, formed with flexible cylindrical or annular wall with suitable thickness and provided with a cam means thereinside. Said motor rotates on its own axis at a predetermined speed, while said cam means is adapted to slide along the inner circumferential surface of said flexible cylindrical wall of the rotor with pressing said surface radially outward to flexibly deform said wall so that the minimum clearance can be defined between the inner surface of the barrel and the outer circumferential surface of the flexible cylindrical wall of the rotor and at the same time the position of the minimum clearance continuously change.

In a further embodiment of the present invention, if the inner diameter of a barrel is designated with designation $D_1$, and outer diameter of a rotor $D_2$, and the length of the rotor L, $D_2/D_1$ is between 0.95 – 0.995, and preferably between 0.97 – 0.99, while $D_2/L$ is below 5 and preferably between 1 – 3. Generally, the minimum clearance C is made 0.1 – 0.2 mm.

According to the apparatus of the present invention, the outer surface of the rotor is smooth and the position of the minimal clearance defined between said surface and the inner surface of the barrel is adapted to always change, or advance around the barrel circumference so that material to be treated never stay within the barrel, thereby preventing thermal degradation or charring of said material.

In the conventional single screw extruder with torpedo, material fed into a barrel is treated separately and stepwise at the feeding zone, the compressing zone, and the torpedo or the kneading zone. According to the present invention, it is also possible that all the necessary compressing and shearing steps are carried out at one time, so that the lengths of the barrel and the rotor can be reduced thereby affording to make the apparatus small in size.

In particular, a rotor of the present invention is adapted to operate in such a manner as the position of the minimal clearance at which large compressive force and shearing force are applied changes with respect not only to the whole circumference of the bore of a barrel but to that of the outer surface of a rotor, so that partial wear of the surface of the rotor is prevented, thus prolonging the life of the rotor.

Further, according to an apparatus of the present invention, space portion in which flow resistance is small and the minimum clearance at which strong compression and shearing is effected exist through the whole length of a barrel. Therefore, pressure for feeding material into the barrel can be decreased.

Further, in an apparatus of the present invention, by which simplification in structure is achieved, a cooling means and a heating means are easily added thereto, so that the temperature of material to be treated can be perfectly controlled.

The present invention can be applied either to thermosetting resins or thermoplastic resins. As examples of thermosetting resins, there are epoxy resin, thermosetting acryl resin, melamine resin, urea resin, phenolic resin, polyester resin and diallyl phthalate resin and the like. As additives for thermosetting resins, there are fillers such as cadmium red, cadmium mercury red, chrome orange, molybdenum orange, chrome yellow, ceramic yellow, cadmium sulfide yellow, ultramarine blue, cobalt alminate blue, carbon black and the like and some preferred stabilizers, which should be selectively used in correspondence with each resin used.

As thermoplastic resins, there are vinyl chloride resin, polystyrene, ABS resin, acrylic resin, polyethylene, polypropylene and the like. Additives for said resins are, for example, fillers such as dioctyl phthalate (DOP), diisodecyl phthalate and some preferred stabilizers, which should be also selectively used in correspondence with each resin used.

OBJECTS OF THE INVENTION

An object of the present invention is to obtain plastic compound material having a good kneading and dispersing property of plastic compound resin and additive therefor by the use of the screw extruder and the roll.

Another object of the present invention is to provide a novel apparatus for carrying out a stirring and mixing operation at a temperature where hardening reaction does not occur so as to perform kneading and dispersing more effectively.

Another object of the present invention is to provide a high-speed shearing, kneading and dispersing apparatus for the purpose of effective and complete kneading and dispersing a material such as synthetic resin.

Still another object of the present invention is to provide an apparatus combining a barrel and an eccentric rotor revolving inside of the barrel and a rotor revolving towards a direction which is reverse that of rotating.

Still another object of the present invention is to provide an effective kneading apparatus employing a stationary barrel and a rotor installed within the barrel, which rotor being eccentrically mounted in a bore of the barrel in order to make locally a narrow clearance between an inner wall of the barrel and an outer wall of the rotor.

Another object of the present invention is to provide a method and an apparatus for preliminarily mixing and fully kneading plastic resin and an additive therefor, cooling the obtained resin material and powdering them so as to obtain resin powder having good dispersion property.

Still another object of the present invention is to provide an apparatus for effectively kneading a material such as synthetic resin by applying compressive force and shearing force upon the synthetic resin and additive therefor placed within the narrow clearance defined between the barrel and the rotor.

Still another object of the present invention is to provide a kneading apparatus for applying compressive force and shearing force on the resin and the additive in the barrel at a predetermined temperature in such a manner that the position of the narrow or minimum clearance can be continuously changed with respect to the whole circumference of the barrel and the rotor.

Still another object is to provide a novel apparatus for uniformly and effectively kneading the synthetic resin and the additive in the barrel by controlling or cooling the barrel with a coolant such as water, whereby the resin and the additive having high-reactivity can be fully kneaded.

Still another object is to provide an apparatus in which plastic resin material and an additive therefor are adapted to be preliminarily mixed in the feeding area and fully kneaded in the kneading area.

The above and other objects and features of the invention will appear more fully hereinafter from a consideration of the following description taken in connection with the accompanying drawings wherein various examples are illustrated by way of example.

BRIEF DESCRIPTION OF THE DRAWINGS

FIG. 1 is a longitudinal section of an example of the apparatus for the method according to the present invention;

FIG. 2 is a cross section of the barrel and the rotor taken along II — II of FIG. 1;

FIG. 7 is a longitudinal section of a fourth modification of the apparatus according to the present invention;

FIG. 8 is a longitudinal section of a fifth modification of the apparatus according to the present invention;

FIG. 9 is a cross section of the barrel and the rotor taken along VIII — VIII of FIG. 8;

FIG. 10 is a longitudinal section of a modification of the rotor of FIG. 8;

FIG. 11 is a longitudinal section taken long XI — XI of FIG. 10;

FIG. 17 shows ninth embodiment of the apparatus performing a method in accordance with the present invention and is a sectional view schematically showing separately disposed screw extruder and a high speed shearing, kneading and dispersing apparatus;

FIG. 19 is a partial section view of tenth embodiment of the apparatus in which the screw extruder and the high speed shearing, kneading and dispersing apparatus being coaxially and integrally arranged;

FIG. 20 is a cross sectional view showing the relation between the barrel and the rotor.

DETAILED EXPLANATION OF THE PREFERRED EMBODIMENTS

Figure 3:
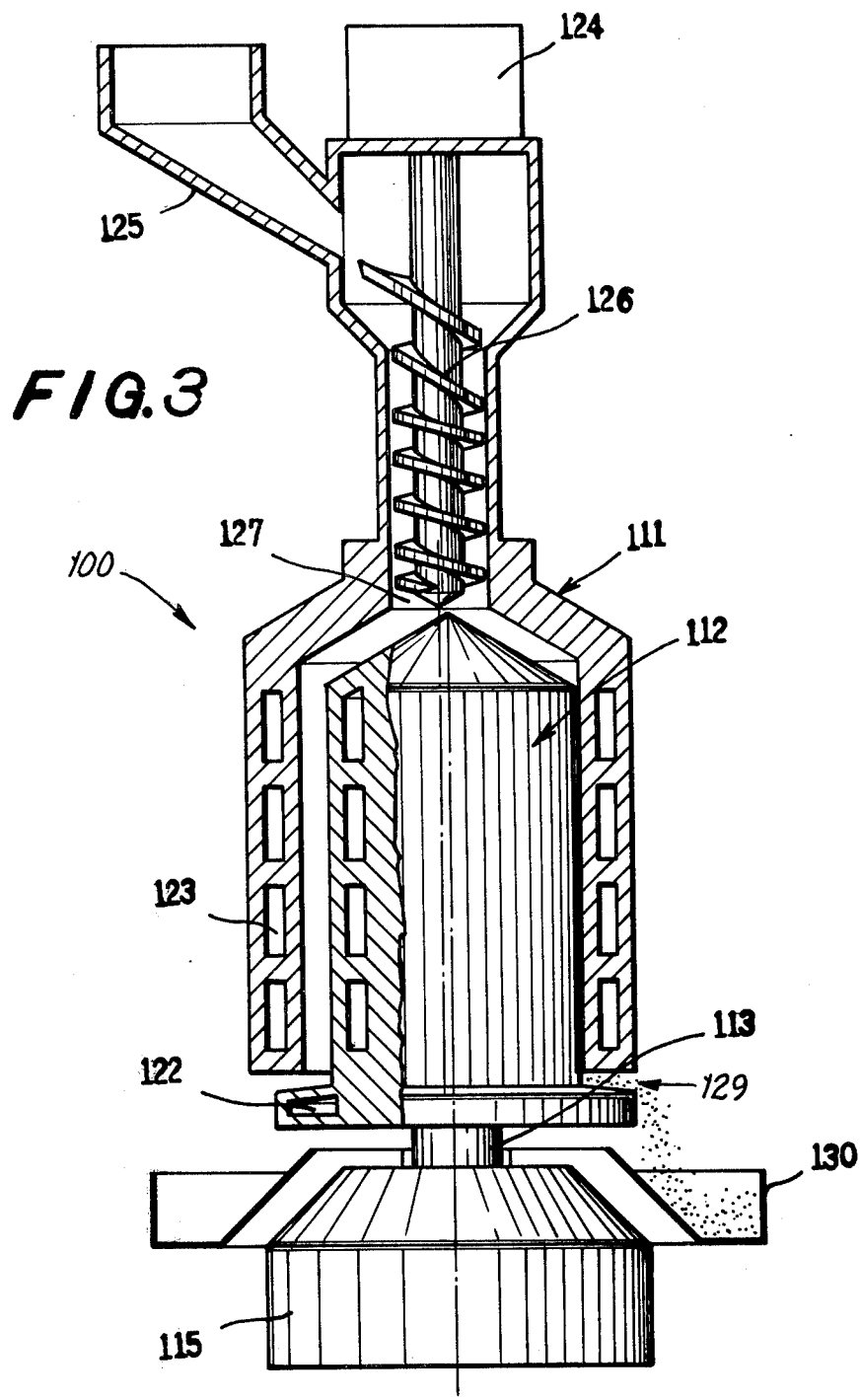
FIG. 3 is a longitudinal section of a second modification of the apparatus of FIG. 1.

Referring now to the drawings, and particularly to FIG. 1, shown is an apparatus 10 of lateral type for carrying out the method of the first embodiment of the present invention. Said apparatus comprises a barrel 11 with a bore 11A with the inner diameter $D_1$ and a cylinder-shaped rotor 12 disposed with eccentricity $\epsilon$ with respect to the axis of said bore and having the outer diameter $D_2$. Said rotor 12 is mounted on a shaft 13 which is adapted to be rotated by means of a first transmission means 15, for example, a belt connected to a first driving means 16. The shaft 13 is rotatably supported by an eccentric bearing 17 which comprises a circular body disposed with eccentricity $\epsilon$ with respect to the central axis $O_2$ of the shaft 13 of the rotor and which can be rotated by means 19, of a second transmission means 18 connected to a second driving means, said rotation of the bearing 17 causing the shaft 13 to move round the axis $O_1$. The second transmission means 18 comprises a gear 20a mounted on the outer surface of the eccentric bearing 17, a gear 20c mounted on a shaft 21 and an intermediate gear 20b engaging with said gears, said shaft 21 being rotated through a suitable transmission means by the second driving means 19. The rotational frequencies of the shaft 13 and the eccentric bearing 17 are adjustable according to demand.

The rotor is provided with a temperature-controller which is adapted to control the temperature of the surface of the rotor suitably according to the kinds of resin to be treated and treating method applied, for example, as shown in the drawing, by feeding cooling or heating medium from a feed source Q through a pipe $P_1$ into a plurality of annular passages 22 communicated with one another and formed within the rotor, and then returning said medium, which has passed through the passages, through a return pipe $P_2$ to the feed source Q. Further, the barrel 11 is also provided with a similar temperature controller which is adapted to cool or heat material to be treated from the side of the barrel by feeding cooling or heating medium through a pipe $P_3$ from the feed source Q into a plurality of annular passages 23, and then returning said medium through a return pipe $P_4$ to the feed source Q. The shaft 13 and the pipes $P_1$, $P_2$ are communicated with each other by means of a rotary joint R.

The rotor and the barrel are formed of material of wear-resisting and high tensile strength properties, for example, nitriding steel.

At the center of the barrel 11 is disposed a material feeding means 24 which is provided with a hopper 25 for storing raw material, a screw conveyer 26 for continuously feeding material from the hopper in the transverse direction and a piston-cylinder assembly 28 for suitably pressure-feeding said material from the conveyer 26 into the barrel.

The use of the apparatus 10 of above-mentioned construction is not restricted only to manufacture of some specified plastic compounds.

For example, in case of kneading a thermosetting resin and an additive therefor in this apparatus 10, firstly the resin and the additive are stored in the hopper 25. The resin and the additive in the hopper are then fed under suitable pressure through the inlet 27 positioned at the center of the barrel into the space portion between the bore 11A of the barrel 11 and the rotor 12. The mixture in the space portion is maintained at a predetermined temperature by means of said temperature controllers of the rotor and the barrel.

Within the barrel, the rotor 12 is rotating on its own axis and at the same time revolving round the axis of the bore of the barrel each at a predetermined rotational frequency, so that the position of the minimum clearance $g$ of the space portion is continuously changing through or advancing around the whole circumference of the barrel. The mixture fed through the inlet 27 is sent axially from the center separately to the right and the left while being roughly kneaded at the space portion and highly kneaded by strong compressive force and shearing force at the minimum clearance $g$, and then discharged out from the two end portions of the barrel. During the time of sending from the center to the ends of the barrel, the mixture passes intermittently through said minimum clearance several times and receives effective compressive and shearing forces, so that the additive can be completely dispersed in the resin.

The plastic discharged out of the two end portions of the barrel is cooled by a suitable cooling means (not shown) and said cooled compound is powdered into available powdered resin in the next process.

Referring to FIG. 3, an apparatus 100 of vertical type which is a second embodiment of the apparatus 10 of FIG. 1 and substantially the same in construction with the latter. In this apparatus 100, a rotor 112 is mounted on the vertical shaft 113 which is adapted to rotate and revolve by means of a driving means 115. Material to be treated is fed from a hopper 125 disposed above a barrel 111 and pushed through an inlet 127 into the barrel 111 by means of a screw 126 driven by a driving means 124. The material which is kneaded in the barrel is, while passing through an outlet 129, cooled by a cooling unit 122 on the side of the rotor or a cooling unit 123 on the side of the barrel, and discharged through said outlet into a container 130.

Figure 4:
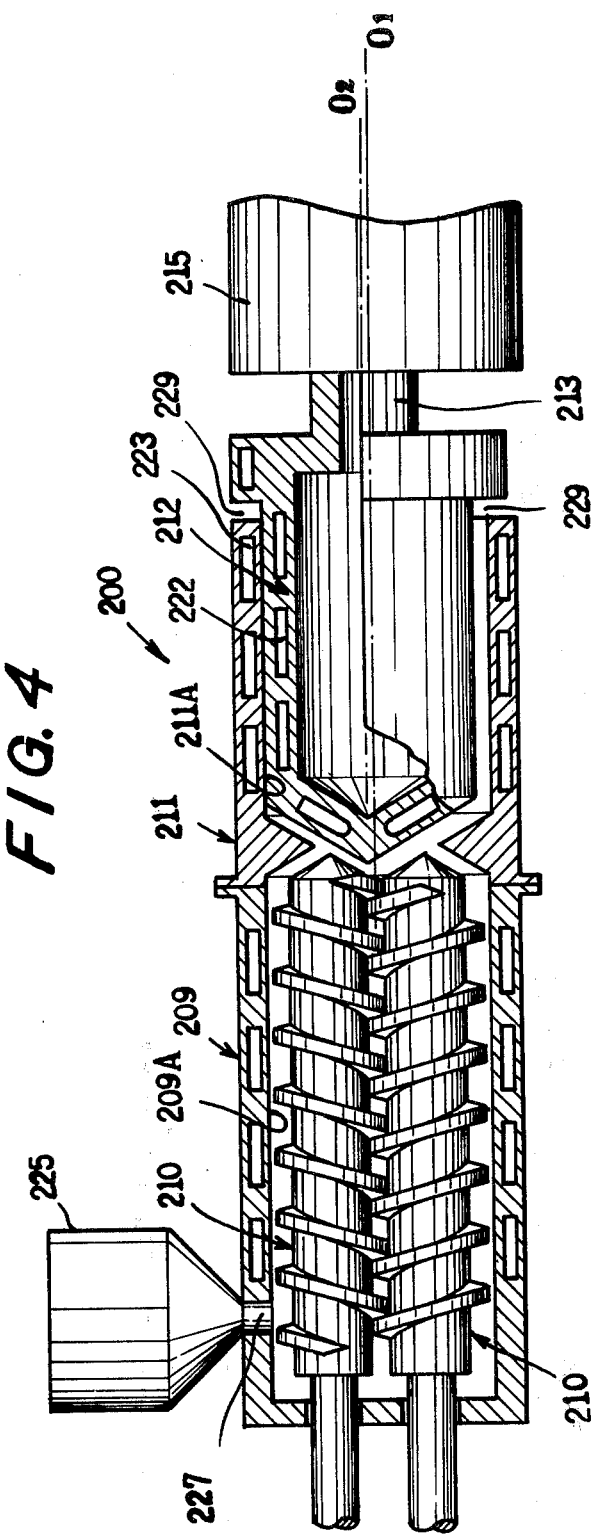
FIG. 4 is a longitudinal section of third modification of the apparatus according to the present invention.

FIG. 4 illustrates a third embodiment of the apparatus of the present invention. The apparatus 200 includes two interengaging screws 210, 210 and an eccentric rotor 212. The two screws are disposed within a first barrel 209 with a bore 209A, and rotated each in the opposite direction by means of a suitable driving means provided at the rear end of this barrel. At the rear portion of the barrel provided is an inlet 227 for material, through which material is fed from a hopper 225 into the barrel. Further the barrel 209 is provided with heating and cooling means. These screws 210 are axially spaced from the eccentric rotor 212. The eccentric rotor 212 is disposed within a second barrel 211 a bore 211A of which is communicated and concentric with the bore 209A of the first barrel 209. Said eccentric rotor is arranged with a predetermined eccentricity with respect to the axis of the second barrel, and adapted to be revolved and rotated by means of a rotor driving means 215 so that the position of the minimum clearance g between the inner surface of the second barrel and the outer surface of the rotor can continuously change with respect to the whole circumference of the inner surface of the barrel. The rotor 212 and the second barrel 211 are each provided with a plurality of intercommunicated annular channels 222, 223 for circulation of heating or cooling medium.

The material fed through the inlet 227 into the first barrel is, being maintained at a predetermined temperature and being stirred, mixed and preliminarily lightly kneaded, pushed forward into the second barrel by means of the screws 210, 210, and continuously kneaded at a predetermined temperature by the rotor 212. The kneaded material is discharged out through the outlet 229.

The screws 210, 210 used in this apparatus 200 may be of such a construction as conventionally used in a two-screw-extruder.

In such an apparatus, raw material is primarily or preliminarily kneaded by the screws 210, 210, and then highly kneaded by the rotor 212, so that plastic compound of higher dispersion property can be obtained.

Further, in case of treating a thermosetting resin with rapid rate of hardening, effective kneading can be obtained by providing an additional inlet at the rear end of the second barrel so that a hardener is separately fed through said inlet after a thermosetting resin and an additive excluding the hardener have been fed through the inlet 227 into the first barrel and then preliminarily kneaded.

Figure 5:
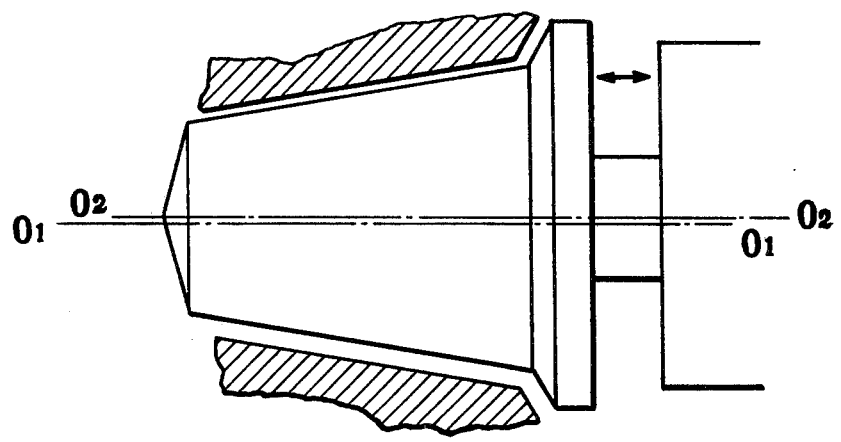
FIG. 5 is an explanatory view of a modification of the rotor according to the present invention.

The bores of the barrels shown in FIGS. 1, 3 and 4 are each shaped into a parallel circular-cylinder, but these rotors and bores thereof may be formed in a tapered or frustoconical shape as shown in FIG. 5. In either case, preferably the inner surface of a barrel and the outer surface of a rotor are parallel with each other.

Figure 6:
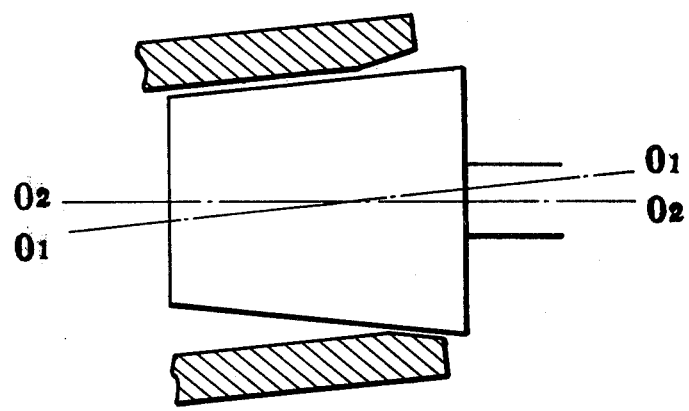
FIG. 6 is a longitudinal section of a further example according to the present invention.

Further, in each of the above-mentioned apparatus, the axis $O_2$ of rotation of the rotor and the central axis $O_1$ of the bore of the barrel are parallel, though they are eccentric with each other. According to the present invention, if the inner surface of the barrel and the outer surface of the rotor which define the minimum clearance are always parallel as shown in FIG. 6, the axis $O_2$ of rotation of the rotor may intersect the central axis $O_2$ of the bore of the barrel. In other words, in such a case, the rotor is adapted to rotate on the axis $O_2$ and at the same time revolve about the axis $O_1$.

FIG. 7 illustrates a fourth embodiment of an apparatus of the present invention. The apparatus 300 includes two interengaging screws 310A, 310B and a rotor 312, one 310A of said screws being formed integral with the rotor 312. The screw 310B is rotated by a driving means 308, while the rotor integral with the screw 310A is eccentrically disposed within a first bore 311A of a barrel 311 and adapted to be revolved and rotated by means of a driving means 315. The two screws 310A, 310B are arranged within a second bore 311B of the barrel 311 and adapted to rotate in the opposite direction respectively, but may be designed to rotate in the same direction.

Since the screw 310A rotates eccentrically together with the rotor 312, extra clearance is intermittently formed between the two screws, thus more or less reducing compressive force and shearing force made by the interengagement of the two screws. But, since the eccentricity of the rotor is usually ½ – 1 mm, if the height of the screw thread of the screws is more than 10 times the eccentricity, it matters little.

Material fed from a hopper 325 through an inlet 327 into the second bore 311B is extruded by the screws 310A, 310B, while being maintained at a predetermined temperature and being mixed and preliminarily kneaded, and then fed into the first bore 311A, where it is highly kneaded with strong compressive force and shearing forces by the rotor 312. The kneaded material is discharged out through an outlet 329.

In FIG. 8 illustrated is a fifth embodiment of an apparatus according to the present invention. An apparatus 400 includes two interengaging screws 410A, 410B disposed within a second bore 411B of a barrel 411 and a rotor 412 disposed in a first bore 411A of the barrel. The screw 410A and the rotor 412 are formed integral with each other by one-piece-molding, welding, bolted connection or the like, and they are formed hollow. Within said hollowed portion a shaft 413 is extending. The rotor 412 comprises a flexible cylinder-shaped or annular wall 419 with suitable thickness which is formed of metal material of high mechanical strength (especially, tensile strength) and high elasticity. Inside the cylinder-shaped wall 419 is provided a cam means comprising a pair of rollers 420 which are rotatably mounted on a bearing means 421 secured to the head portion of the shaft 413. Further, each of said rollers 420 is so mounted as to move in the radial direction according to demand so that the minimum clearance g can be adjusted. Each of the rollers 420 is adapted to roll along the inner circumferential surface of the rotor, always with pressing the cylinder-shaped wall 419 of the rotor from inside. Therefore, the position of the minimum clearance defined between the outer surface of the rotor 412 and the inner surface of the first bore 411A can change through or advance around the whole circumference of the bore. The revolution of the rollers 420 is made through the bearing means 421 by the shaft 413, which is rotated by means of a suitable driving means (not shown). The screw 410A formed integral with the rotor 412 and the screw 410B are also driven by a suitable-driving means (not shown). Usually, each of the rollers 420 are rotated in the opposite direction to the rotation of the rotor 412.

The barrel 411 is provided with a plurality of annular channels for circulation of cooling or heating medium. A passage 432 for feeding lubricating, heating or cooling medium from outside passes through the shaft 413. This passage 432 is communicated with a plurality of openings 433 provided in the head portion of the shaft. Through these openings said medium is sprayed into the inside of the cylinder-shaped wall 419.

In an apparatus with screws as above-mentioned, the number of screws may be more than three. More than three screws interengaging with one another and rotating in the same or opposite direction can extrude mixture, thereby effectively mixing and kneading the same.

In FIGS. 10 and 11 is shown a modified embodiment of the cam means in the rotor shown in FIG. 8. A cam means of the rotor 412 shown here comprises a cam 430 with elliptical section formed integral with the shaft 413. Said cam moves along the inner circumferential surface of the flexible cylinder-shaped wall 419 while always with pressing said inner circumferential surface, so that the position of the minimum spaced portion can change. The cam 430 is provided between the outside surface thereof and the inner surface 419 with a plurality of passages 431 for feeding lubricating, heating or cooling medium (for example, oil). These passages 431 are communicated with a passage 432 passing longitudinally through the inner portion of the shaft 413 so that said medium is fed into this passage 432.

Figure 12:
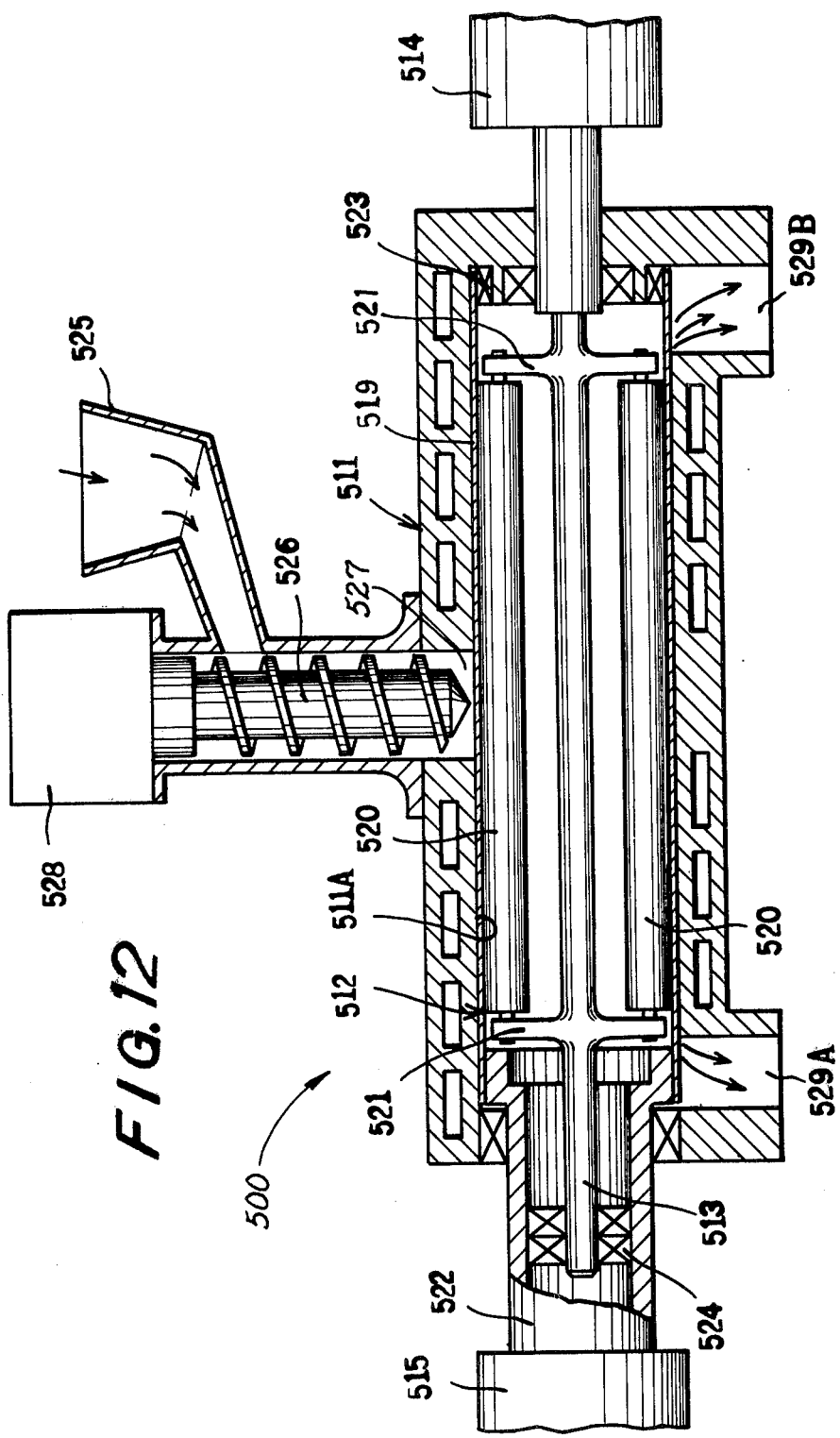
FIG. 12 is a section of a sixth example of the apparatus according to the present invention.

Referring to FIG. 12, a sixth embodiment is shown. In an apparatus 500, an inlet 527 for feeding material is disposed at the center with respect to the length of a barrel 511. Through the inlet 527, material which is pressure-fed into the barrel is branched from the center of the barrel toward the two ends thereof, while being kneaded. A rotor 512 has the same function as the rotor 412 shown in FIG. 8. The rotor 512 is provided in a barrel 511 with a flexible cylinder-shaped wall 519 disposed concentrically with a bore 511A of said barrel 511. Inside the wall 519 is provided a cam means comprising a pair of elongated rollers 520 mounted on a bearing means 521 so as to be rotatably and movably adjustable in the radial direction, said bearing means 521 being fixed on a shaft 513. The shaft 513 which causes the rollers 521 to revolve is interlockingly connected to a driving means 514. One end of the flexible cylinder-shaped wall 519 is secured to a rotary shaft 522 connected to a driving means 515, while the other end is supported by a bearing 523 fitted on the barrel. The head portion of the shaft 513 is supported by a bearing 524 fitted on the rotary shaft 522. Material to be treated or a resin and an additive is pressure-fed from a hopper 525 through an inlet 527 into the middle portion in the barrel and then branched toward the two ends of the barrel, by means of a screw 526 rotated by a driving means 528. The material kneaded by the rotor 512 in the same manner as by the rotor shown in FIG. 7 is discharged out through outlets 529A, 529B provided on each end portion of the barrel.

Figure 15:
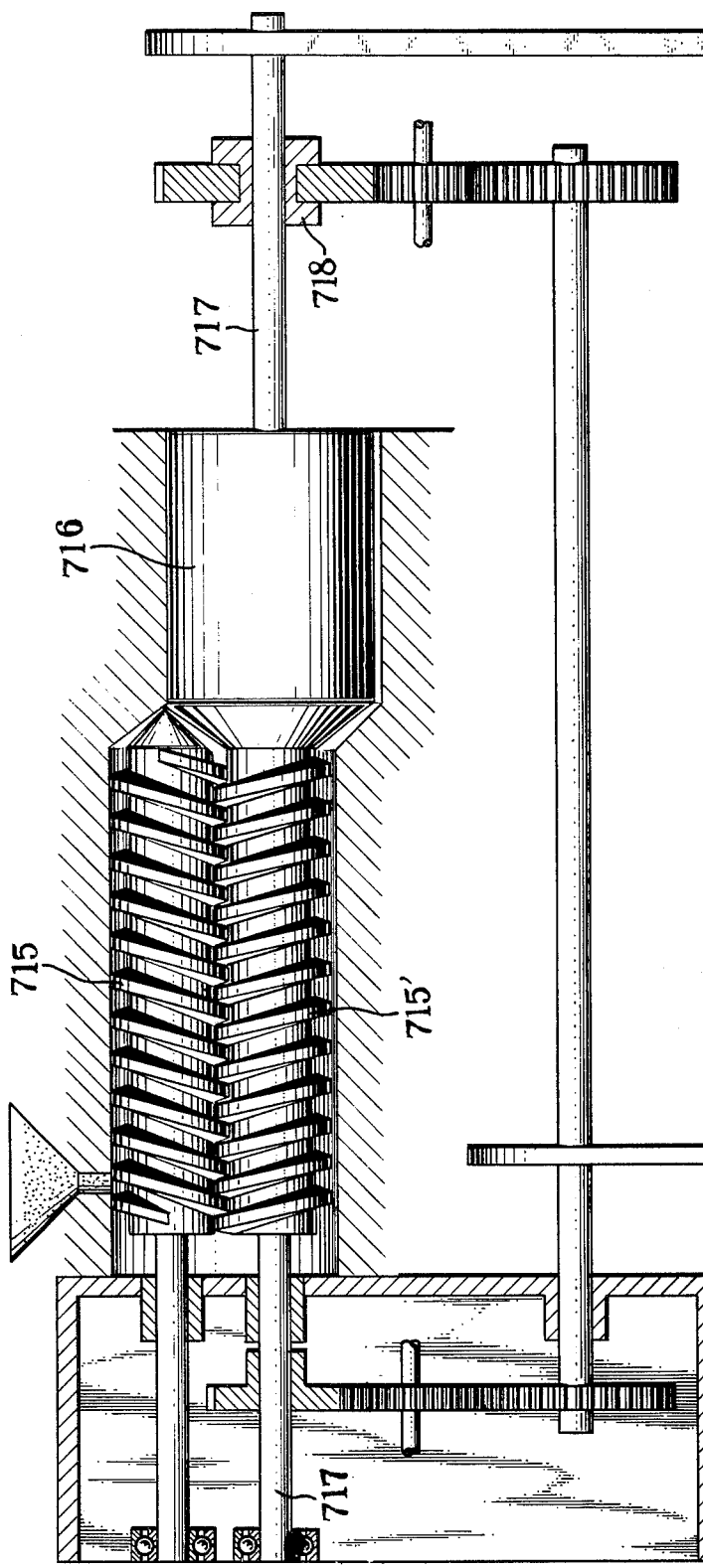
FIG. 15 shows a schematic sectional view of eighth embodiment.

With reference to FIG. 15, there is shown an eighth embodiment of this invention. The apparatus of this embodiment according to the present invention is provided with screws 715, 715' and an eccentric rotor 716. Said screw 715' and an eccentric rotor 716 are formed integrally with each other and driven from both sides. In short, the screw 715' and the eccentric rotor 716 are rotated by means of a shaft 717 and revolved by eccentrically rotating a bearing 718 which rotatably supports a shaft 717. Furthermore, the rotation of the screw 715' from a left side thereof is synchronized with that of the eccentric rotor 716 from a right side thereof by means of a suitable means.

Figure 13:
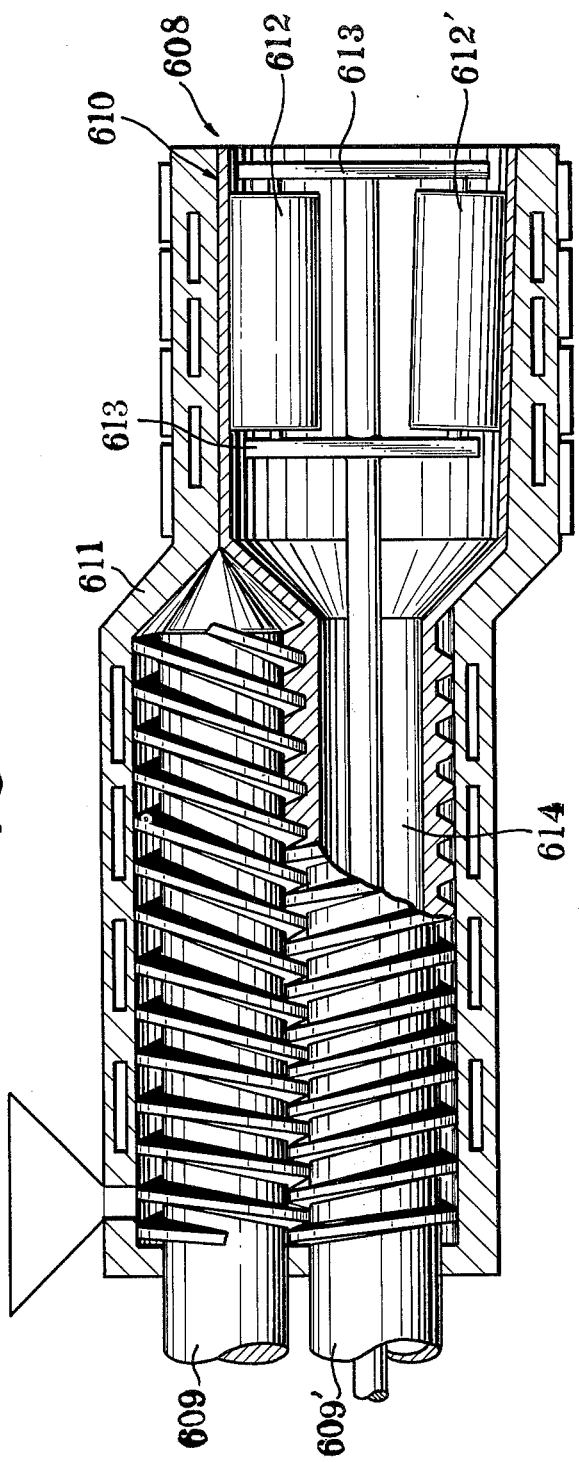
FIG. 13 shows a schematic sectional view of the combined screws and a rotor of seventh embodiment of the present invention.

The apparatus shown in FIG. 15 operates as effectively as that of FIG. 13. In the case of the apparatus of FIG. 15, the screw 715' rotates eccentrically and the width of the clearance formed between the screws 715 and 715' is changed a little.

In this apparatus, the rotating speed and the revolving speed of the screw 715' and a rotor 716 can be changed arbitrarily. When the speed of the rotation and the revolution is made equal to each other, the resin mixture is subjected to only compressive action.

When the speed of the rotation and the revolution of them is different from each other, the resin mixture is subjected to shearing action.

In the above-said kneading apparatus there are provided two multiple screws and it is understood that more than three screws may be provided.

When more than three screws are installed and engaged with each other and they are rotated towards the equal direction or towards different direction while the mixture is forwarded, much more excellent propelling power and splendid mixing action are obtained. It will be also noted that when more than three rotors are installed and more excellent kneading is expected.

Figure 16:
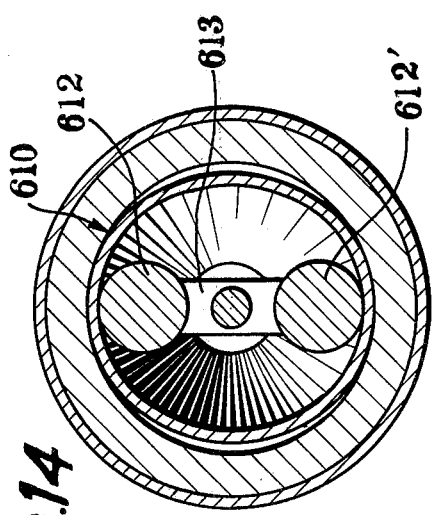
FIG. 16 shows an explanatory view of a conventional apparatus carrying out the kneading and dispersing process.

FIG. 16 designates an apparatus of the prior art. In the conventional apparatus, material M of thermosetting resin and additive containing pigment and setting agent are supplied into a hopper H and fed into a cylinder C by means of a feed screw. The material supplied into the cylinder C is kneaded and dispersed by the screw S which is adapted to rotate within the cylinder C. T is a heating and cooling means. However, the conventional kneading and dispersing apparatus does not employ a shearing action adapted to be carried out onto the material, so that poor kneading and dispersing effect is obtained.

Referring to the ninth embodiment of the apparatus illustrated in FIG. 17, an eccentric rotor 801 of a high speed shearing, kneading and dispensing apparatus has a jacket 802 for the circulation of heating and cooling medium so as to adjust the temperature. The rotor 801 is driven through a driving means 804 so as to rotate with respect to an axis 803 of the rotor which is separated by eccentricity $\epsilon$ away from a central axis O — O. The driving means 804 makes the rotor 801 rotate with respect to its axis 803 as well as revolve round the central axis O — O and further, incorporates a mechanism for changing the amount of eccentricity of $\epsilon$.

Also, the barrel 805 has a jacket 806 for passing the heating and cooling medium therethrough. The molding products 809 subjected to kneading and dispersing action by the use of the high speed shearing, kneading and dispersing operation is discharged from an extruding outlet 807 and collected into a receiver 808.

Material to fed into the high speed shearing, kneading and dispersing apparatus is stirred and mixed in a screw extruder having a screw 810 which rotates in a cylinder 811 and heated or cooled by a heating and cooling apparatus 812. According to the ninth embodiment as shown in FIG. 17, when the resin material 819 is supplied to a hopper 818, this material is mixed with a additive including no setting agent.

The material is fed into the cylinder 811 by means of a feeding screw 815 driven by an electric motor 817 through a final reduction gear 816. The screw 810 is rotatably driven by means of the electric motor 814 through a final reduction gear 813.

The setting agent 821 is supplied directly to the high speed shearing, kneading and dispersing apparatus.

Figures 18A, 18B:
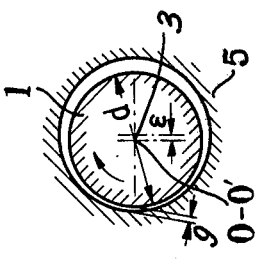
FIGS. 18A and 18B are cross sectional views showing the change of relative position between a barrel and a rotor.

As seen in FIGS. 18A and 18B, the rotor 1 rotates with respect to the axis 3 which is deflected by eccentricity E from the central axis within the barrel 5 and is revolved with respect to the central axis O — O towards the direction opposite to that of the rotation, so that a minimum clearance g defined between the rotor and the barrel moves along an entire periphery of the barrel and an equal shearing operation is obtained.

FIGS. 19 and 20 illustrate the 10th embodiment of the high speed shearing, kneading, and dispersing apparatus which is provided coaxially with a screw extruder. The high speed shearing, kneading and dispersing apparatus has a rotor 901 rotating with respect to an axis 903 deflected from a central axis of the barrel 905 within the stator 905. A driving means 904 controls the amount of the revolution and the rotation as well as the eccentricity, which is quite equal to the apparatus illustrated in FIG. 17 except a fact that setting agent is added to the additive fed to the screw extruder together with the resin.

Figure 21:
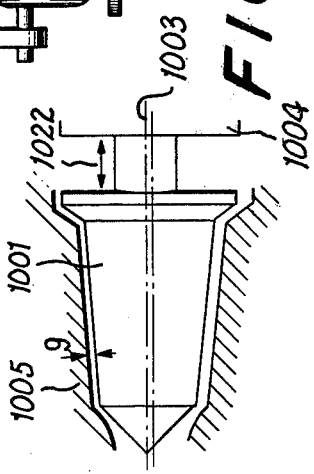
FIG. 21 is a partial section of another embodiment of the stator and the rotor.

In the 11th embodiment shown in FIG. 21, a rotor 1001 is tapered or frustoconical in form, which is different from the embodiment illustrated in FIG. 4. The rotor 1001 revolves with respect to an axis 1003 deflected from a central axis within the barrel 1005. In this embodiment, the rotor 1001 is axially moved as shown in an arrow mark 1022, whereby a minimum clearance g may be changed.

Figure 14:
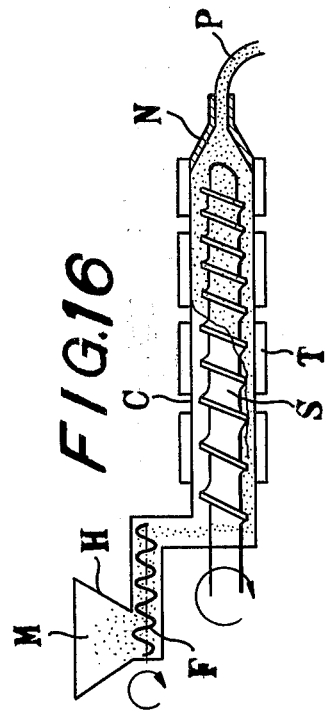
FIG. 14 is a sectional view of a rotor portion of an apparatus shown in FIG. 13.

FIG. 13 shows seventh embodiment of the present invention and an apparatus 608 is provided with multiple screws 609, 609' and a rotor 610. The screw 609 is disposed only in a feeding area the extremity portion of which converges in a conical shape to a circumferential surface of a barrel in a kneading area. A barrel 611 of the kneading area is slightly tapered. The screw 609' and the rotor 610 are integrally formed by an integral molding, screw-fastening and welding. On an inner circumferential surface of the rotor 610, the roller 612, 612' contact rotatably by means of a rod 613. The rotor 610 is made of steel, for example, stainless steel which is high in resiliency. The rotating number of the rotor 610 is the same as that of the screw 609'. A circumferential wall of the screw 609' is made thin, for example, 2 to 3 mm. As shown in FIG. 14, when rollers 612, 612' contact the rotor 610, the rotor 610 is deformed and a rotor portion located between the barrel 611 and the rollers 612, 612' contacts an inner circumferential surface of the barrel and rotates. Normally, rollers 612, 612' rotate differently from the rotor 610 and they are rotated through the rod 613. The rod 613 is rotated through a hollow portion 614 of the screw 609' or a suitable driving means (not shown) from a right end of the apparatus 608.

In the apparatus as shown in FIGS. 13 and 14, synthetic resin and additive used therefor supplied to a hopper are fed to the kneading area through a feeding area and the kneading operation is completely carried out by the rotor 610. At this time, the mixture introduced in the screw 609 in the feeding area is conveyed to the rotor 610 in the kneading area, as that it is important to prevent the synthetic resin from staying at a portion situated between the screw 609 and the rotor 610. By changing the rotational speed of the rotor 610, and the rollers 612, 612' optionally, compressive operation and shearing operation in accordance with the synthetic resin can be applied to a resin mixture.

When the rotating number of the rotor 610 is the same as that of the rollers 612, 612' the shape of the rotor 610 is fixed and a center of the rotor 610 is not changed. On the other hand, when the rotating number of the rotor 610 and the rollers 612, 612' is different from each other, the center of the rotor 610 is changed. In this case, the rotor 610 is broadly an eccentric rotor 610.

Examples of the present invention are set forth below.

EXAMPLE 1

In the apparatus shown in FIG. 1, the bore of the barrel is 140 mm in diameter and 300 mm in length, the rotor is 139 mm in outer diameter and 350 mm in length, and the minimum clearance is 0.1 mm.

67 parts of an epoxy resin of molecular weight 1400 (under the trade name of EPIKOTE 1004 manufactured by Shell International Chemicals Corp.), 20 parts of titanium white, 5 parts of dicyanamide, 3 parts of aerogel and 2 parts of polyvinyl butyral are mixed and fed through the hopper into the apparatus. The resin mixture is kneaded with rotational frequency or speed of the rotor 30 – 60 r.p.m. and revolutional speed thereof 50 – 100 r.p.m. at the temperature of 90° – 110° C measured in the bore. The maximum granular diameter of pigment in the obtained plastic compound is below $25\mu$, which is less than half a granular diameter of pigment obtained by the conventional method.

This plastic compound is cooled and powdered into powdered resin. This powdered resin is coated on a metal product by electrostatic method, uniform and smooth coated surface can be obtained.

EXAMPLE 2

In the apparatus shown in FIG. 7, the first bore of the barrel is 140 mm in diameter and 300 mm in length, while the second bore is 100 mm in diameter and 500 mm in length. The screw thread of each screw is 20 mm in height, and the rotor is 138 mm in outer diameter and 180 mm in length.

Resin material of the same mixing ratio with that of Example 1 is fed through hopper into this apparatus. The material is kneaded with rotational speed of the screw and consequently of the rotor 30 – 60 r.p.m. and revolutional speed of the rotor 50 – 100 r.p.m. under the same temperature condition with Example 1. The maximum glanular diameter of pigment of the obtained plastic compound is below $10\mu$.

EXAMPLE 3

In the apparatus shown in FIG. 8, the first bore of the barrel is 140 mm in diameter and 300 mm in length, while the second bore is 100 mm in diameter and 500 mm in length. The screw thread of each screw is 20 mm in height and the mean diameter of the flexible rotor is 130 mm.

Resin material of the same mixing ratio with that of Example 1 is fed through a hopper into this apparatus. The material is kneaded with rotational speed of the screw 30 – 60 r.p.m., and that of the rollers 50 – 100 r.p.m. at the temperature of 30° – 90° C in the second bore, 90° – 105° C in the first bore and 40° – 30° C at the head portion of the first bore. The maximum granular diameter of pigment in the obtained plastic compound is below 20 $\mu$. This compound is cooled and powdered into powdered resin. When this powdered resin is coated on a metal product by electrostatic method, uniform and smooth coated surface can be obtained.

EXAMPLE 4

78 parts of self-cross-linking acrylic resin, 20 parts of titanium white and 2 parts of Phthalocyanine Blue are mixed and fed through the hopper into the apparatus shown in FIG. 7. Plastic compound is obtained under the same condition with Example 3.

EXAMPLE 5

In the apparatus shown in FIG. 13, an inner diameter of each barrel in the feeding area is 100 mm and length thereof is 500 mm. The barrel occupying the kneading area is 140 mm in inner diameter and length thereof is 300 mm. Each screw tooth of multi-screws, is 20 mm in height. Flexible rotor is 138 mm in average diameter.

To this apparatus, resin mixture is supplied from the hopper. The screw is rotated at 30 to 60 r.p.m. and the roller is rotated at 50 – 100 r.p.m. The temperature of the feeding area is maintained at 30° to 90° C, that of the kneading area at 90° to 105° C and that of an end portion thereof at 105° to 30° C in order to carry out the kneading operation effectively.

The maximum grain size of pigment of the obtained plastic compound is below 20μ.

This plastic compound is cooled and powdered so as to make powdered resin.

When this powdered resin is coated on a metal product by electrostatic process, uniform and smooth coated surface can be obtained.

EXAMPLE 6

In the apparatus shown in FIG. 15, each barrel in the feeding area is 100 mm in an inner diameter, length thereof is 500 mm, and the barrel placed in the kneading area is 140 mm in an inner diameter. Height of screw thread of multi-screw is 20 mm and diameter of the eccentric rotor is 138 mm.

To this apparatus plastic compound material is supplied from a hopper. The rotational speed of the screw or the rotational speed of the eccentric rotor is adapted to be at 30 to 60 r.p.m. The revolutional speed of the eccentric rotor is made at 50 to 100 r.p.m. and the kneading operation is carried out at a suitable temperature. The maximum grain size of pigment contained in the obtained plastic compound is below 10μ.

EXAMPLE 7

78 parts of self-cross-linking acrylic resin, 20 parts of titanium white and 2 parts of phthalocyanine blue are mixed and the mixture is fed through the hopper into the apparatus shown in FIG. 15. Plastic compound is obtained under the same condition with Example 6. The material was kneaded under the same condition with that of Example 6 and the material having same property was obtained.

What we claim is:

1. An apparatus for producing plastic material, comprising:
   a. a barrel having a bore;
   b. a rotor disposed within the bore with a radial clearance between it and the bore surface and with its axis eccentrically positioned relative to the bore axis so that there is at least one point around the circumference of the bore where the radial clearance is less than at the remaining points around the circumference;
   c. feeding means for feeding plastic material under pressure into the radial clearance between the rotor and the bore surface;
   d. rotor rotating means for rotating the rotor about its axis; and
   e. revolving means for revolving the rotor axis about the bore axis so that the point of minimum radial clearance between the rotor and the bore surface continuously advances around the bore circumference.

2. The apparatus of claim 1 wherein the bore and the rotor are cylindrical in form and the rotor axis is substantially parallel to the bore axis.

3. The apparatus of claim 1 wherein the bore and the rotor are frustoconical in form and the rotor and bore axes are substantially parallel.

4. The apparatus of claim 1 wherein:
   a. the bore is cylindrical in form;
   b. the rotor is frustoconical in form; and
   c. the bore axis intersects the rotor axis.

5. The apparatus of claim 1 wherein the bore and rotor are cylindrical in form and the ratio of the rotor diameter to the bore diameter is in the range of from 0.95 to 0.995.

6. The apparatus of claim 1 wherein the bore and the rotor are cylindrical in form and the ratio of the bore length to the rotor diameter is less than 5.

7. The apparatus of claim 1 wherein the minimum radial clearance is in the range of from 0.1 to 0.2 mm.

8. The apparatus of claim 1 and including temperature controlling means for controlling the temperature of the barrel and the rotor.

9. The apparatus of claim 8 wherein the temperature controlling means includes a plurality of passages in the rotor and in the barrel and a circulating means for circulating a temperature controlling fluid medium through the plurality of passages.

10. The apparatus of claim 1 wherein the feeding means includes at least one screw for preliminarily kneading plastic material as it is fed into the radial clearance between the rotor and the bore surface.

11. The apparatus of claim 1 wherein the feeding means includes:
    a. a first screw integral with and rotatable with the rotor;
    b. a second screw interengaged with the first screw; and
    c. second screw rotating means for rotating the second screw independently of the rotor and the first screw.

12. An apparatus for producing plastic compound, comprising:
    a. a barrel having a bore;
    b. a rotor having a flexible annular wall disposed substantially coaxially within the bore and with a radial clearance between it and the bore surface;
    c. feeding means for feeding plastic material under pressure into the radial clearance between the rotor and the bore surface;
    d. rotating means for rotating the rotor about its axis;
    e. deforming means within the flexible annular wall for deforming the wall radially outward at at least two circumferentially spaced positions to create points where the radial clearance between the annular wall and the bore surface is at a minimum; and
    f. advancing means for rotating the deforming means to advance the points of minimum radial clearance around the bore circumference.

13. The apparatus of claim 12 wherein:
    a. the deforming means includes at least two rollers bearing upon the internal surface of the flexible annular wall; and
    b. the advancing means includes a means for revolving each roller around the coaxis of the bore and the rotor.

14. The apparatus of claim 13 wherein the radial spacing of the axis of each roller from the coaxis of the bore and the rotor is adjustable.

15. The apparatus of claim 12 wherein the deforming means includes an elliptical cam coaxial with respect to the bore and rotor axis and bearing upon the internal surface of the flexible annular wall at two diametrically opposite positions.

16. The apparatus of claim 12 and including temperature controlling means for controlling the temperature of the barrel and the rotor.

17. The apparatus of claim 16 wherein the temperature controlling means includes a plurality of passages in the rotor and in the barrel and a circulating means for circulating a temperature controlling fluid through the plurality of passages.

18. The apparatus of claim 12 wherein the feeding means includes at least one screw for preliminarily kneading plastic material as it is fed into the radial clearance between the rotor and the bore surface.

19. The apparatus of claim 12 wherein the feeding means includes:
   a. a first screw integral with and rotatable with the rotor;
   b. a second screw interengaged with the first screw; and
   c. second screw rotating means for rotating the second screw independently of the rotor and the first screw.

20. The apparatus of claim 12 wherein the bore and the rotor are cylindrical in form and the ratio of the rotor diameter to the bore diameter is in the range of from 0.95 to 0.995.

21. The apparatus of claim 12 wherein the bore and the rotor are cylindrical in form and the ratio of the bore length to the rotor diameter is less than 5.

22. The apparatus of claim 12 wherein the minimum radial clearance is in the range of from 0.1 to 0.2mm.

* * * * *